Oct. 21, 1941.　　　　D. A. KELLY　　　　2,259,977

GREASE FITTING

Filed March 23, 1940

Inventor
D. A. Kelly

By

Attorneys

Patented Oct. 21, 1941

2,259,977

UNITED STATES PATENT OFFICE 2,259,977

GREASE FITTING

Daniel Allcott Kelly, Milwaukee, Wis., assignor to The Prime Manufacturing Company, Milwaukee, Wis.

Application March 23, 1940, Serial No. 325,658

1 Claim. (Cl. 184—105)

This invention appertains to the lubrication of bearings and the like, and more particularly to grease fittings for permitting the filling of parts to be lubricated with grease from a high pressure hose or grease gun.

In lubrication, the grease is forced under great pressure (particularly in the bearings of locomotives) through the fitting and into the part to be lubricated. The fitting or nipple (which receives the coupling head of the high pressure hose or gun, as the case may be) is provided with an internal transversely extending bridge strap, which supports the sealing plunger and spring unit. When the pressure of the grease is exerted on the sealing plunger and strap, the strap often collapses and the strap and sealing unit fall in the bearing. Much time and labor has been expended in an effort to properly anchor the strap in position, and it is now customary to screw the nipple or fitting down on the adaptor or similar device, so that the strap will be supported by the inner end of the adaptor. However, even when the ends of the strap are supported by the adaptor, the central portion of the strap tends to bow and collapse. Thus, a positive seal of the nipple is not insured, and, likewise, the strap does not give the desired and sufficient bearing for the stem of the sealing plunger.

It is, therefore, one of the primary objects of the present invention to provide a strong and durable support for the spring and sealing plunger, which, in effect, forms an integral part of the fitting or nipple, and which will not collapse under pressure, and which does not depend on an adaptor to support it, and which insures a positive seal of the fitting under all conditions.

Another salient object of my invention is the provision of a supporting bridge for the sealing plunger and spring of a lubricating fitting or nipple of a disc shape, which can be threaded into the fitting on the same threads utilized for connecting the fitting or nipple with the adaptor into intimate tight engagement with a shoulder formed in the fitting or nipple.

A further important object of my invention is the provision of a bridge of a disc shape for locking engagement around its entire periphery with the interior wall of the fitting or nipple, whereby an adequate support will be provided for the bridge, and whereby collapsing of the bridge will be prevented, and whereby an elongated bearing will be provided for the stem of the sealing plunger.

With the use of hard grease it is exceedingly difficult to thoroughly strain the same and rid the grease of all foreign matter. Hence, injury is often caused to the bearing, due to the entrance of foreign matter with the grease.

It is, therefore, a further salient object of my invention to provide means for constructing the bridge, whereby the bridge will act as an effective strainer for the grease and other matter entering the fitting, and prevent the entrance of foreign matter in the bearing.

With these and other objects in view, the invention consists in the novel construction, arrangement, and formation of parts, as will be hereinafter more specifically described, claimed, and illustrated in the accompanying drawing, in which drawing:

Figure 1:
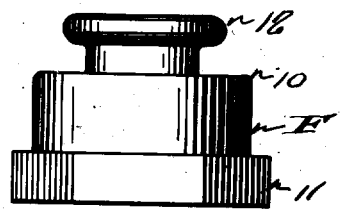
Figure 1 is an elevational view of the improved fitting or nipple.
Figure 2:
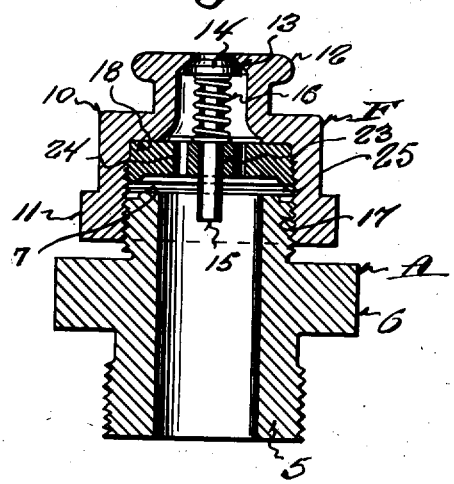
Figure 2 is a central section through the nipple or fitting, showing the same threaded on an adaptor or similar connection, and illustrating the use of the novel bridge member, the view through the nipple or fitting being taken substantially on the line 2—2 of Figure 3, looking in the direction of the arrows.
Figure 3:
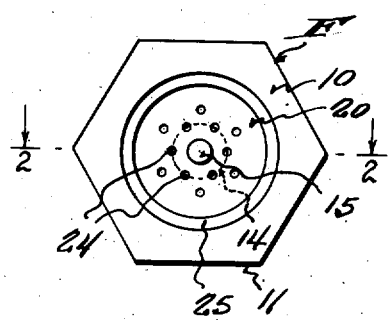
Figure 3 is a bottom plan view of the fitting or nipple, looking toward the novel bridge member.
Figure 4:
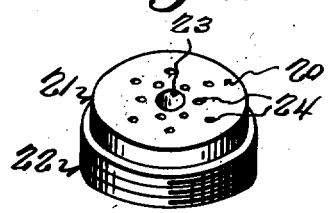
Figure 4 is a perspective view of the bridge member per se removed from the fitting.

Referring to the drawing in detail, wherein similar reference characters designate corresponding parts throughout the several views, the letter F generally indicates a grease fitting or nipple, which can be detachably connected with an adaptor or similar member A, which can be threaded into the bearing or part to be lubricated.

While the adaptor A forms no part of the present invention, it is to be noted that the same includes a tubular sleeve 5 having its opposite ends of different sizes and threaded, and an intermediate part formed with a polygonal wrench-engaging enlargement 6. The outer end of the adaptor A can be provided with a raised rib 7, for a purpose which will be later set forth.

The fitting F includes the hollow body 10 having its inner end provided with the polygonal enlargement 11, which permits the same to be readily turned by a wrench. The outer end of the body carries a buttonhead 12 or similar member to permit the ready connection of the coupling of a grease gun or high pressure hose with the body. The inner face of the buttonhead 12 is shaped to form a valve seat 13 for the sealing plunger 14. The sealing plunger 14 includes the axially disposed stem 15, and the stem has coiled thereabout an expansion spring 16, one end of which bears against the inner face of the sealing plunger 14.

In accordance with my invention, I provide a strong and rugged support for the sealing plunger, and one which will give an adequate bearing surface for the sealing plunger, whereby the canting or tilting of the plunger is prevented.

As brought out in the objects of the specification, where a supporting strap is utilized, the same will collapse when continued high pressure is placed thereon and on the plunger, even though the nipple or fitting F is threaded down tight on the adaptor, so that the inner end of the adaptor will engage the ends of the strap.

My novel bridge is generally indicated by the reference character 20, and the same includes a disc-shaped body or bridge plate 21 having its outer surface for a portion of its thickness provided with threads 22. These threads 22 mate with the interior threads 17 of the body 10 of the fitting, and, hence, the threads 17 form a support for the disc-shaped bridge plate around its entire periphery. The threads 17 are utilized for connecting the fitting or nipple on the adaptor.

The inner face of the bridge 20 is left plain and smooth for sealing engagement with the interior shoulder 18 formed in the body 10. The axial center of the bridge is provided with a guide opening 23 for receiving the stem 15 of the sealing plunger, and the bridge around the axial opening 23 is provided with an annular row of openings 24 for permitting the flow of grease through the same. The bridge 20 has its outer face preferably, but not necessarily, provided with a depending annular rim 25. This rim can engage close about the annular rib 7 formed on the outer end of the adaptor A, when the parts are screwed down tight. When the parts are screwed down tight, the escape of grease from between the fitting F and the adaptor A is positively prevented.

Obviously, the bridge 20 forms an adequate support for the sealing plunger 14 and the spring 16, and as the bridge is supported all around its periphery the bridge does not depend upon the adaptor A for its support, and the bridge will not collapse or bow under pressure, and, consequently, proper sealing of the plunger 14 is insured at all times.

The openings 24 are formed relatively small and are of such a character as to act as an effective strainer. Thus, the bridge 20 prevents the flow of any foreign matter into the nipple or adaptor of the bearing. The openings 24 are formed much smaller than the outlet of the grease gun or the head or nozzle of the grease pressure hose.

Changes in details may be made without departing from the spirit or the scope of my invention, but what I claim as new is:

In a grease fitting, a hollow body having an interior valve seat at its outer end and having its inner end internally threaded, a shoulder formed in the body at the end of the thread, a sealing plunger having a stem for the valve, a support for the sealing plunger including a disc-shaped bridge plate of material thickness having its periphery threaded for engaging the threads of the body, the plate being adapted to be threaded into the body tight against the shoulder, and said plate having an axial guide opening therethrough for the stem of the plunger, and openings around the axial opening of less size than said axial opening for the passage of grease and for straining the grease, a depending annular rim on the plate, and a member externally threaded for fitting on the threads of the body, the inner end of said member having an annular rib for intimately engaging the rim.

DANIEL ALLCOTT KELLY.